United States Patent [19]

Hornbeck

[11] 4,441,791
[45] Apr. 10, 1984

[54] DEFORMABLE MIRROR LIGHT MODULATOR

[75] Inventor: Larry J. Hornbeck, Van Alstyne, Tex.

[73] Assignee: Texas Instruments Incorporated, Dallas, Tex.

[21] Appl. No.: 386,141

[22] Filed: Jun. 7, 1982

Related U.S. Application Data

[63] Continuation of Ser. No. 183,595, Sep. 2, 1980, abandoned.

[51] Int. Cl.$^3$ .................................................. G02F 1/29
[52] U.S. Cl. .................................... 350/360; 350/385; 372/26; 372/49; 372/46; 357/30; 357/51
[58] Field of Search .............................. 350/360, 385; 372/43–46, 49, 26; 357/30, 51

[56] References Cited

U.S. PATENT DOCUMENTS

| | | | |
|---|---|---|---|
| 3,886,310 | 5/1975 | Guldberg et al. | 350/360 |
| 3,912,370 | 10/1975 | Roach | 350/360 |
| 4,013,345 | 4/1977 | Roach | 350/360 |

Primary Examiner—William L. Sikes
Assistant Examiner—Leon Scott, Jr.
Attorney, Agent, or Firm—Robert Groover; Melvin Sharp; James T. Comfort

[57] ABSTRACT

A light modulator comprising a light-reflective metallized membrane defining a deformable mirror disposed over a semiconductor substrate of one conductivity type in which a matrix array of field effect address transistors are formed, the metallized membrane cooperating with a matrix of floating metallic field plate members disposed on an insulating layer covering the substrate to define an array of air gap capacitors for line addressing by the field effect address transistors. The floating metallic field plates are opaque to light and prevent photocharge generation in the active regions of the matrix array of field effect address transistors. The metallized membrane is spaced from the field effect address transistors and the metallic floating field plates by an upstanding semiconductor grid structure which is formed on the insulating layer of the semiconductor substrate and defines gate electrodes for the address transistors. The metallized membrane is mounted on the upstanding semiconductor grid structure by molecular bonding to the contact members disposed over the semiconductor grid structure. The metallized membrane is formed of a polymer of nitrocellulose as a flexible carrier layer on at least one surface of which is disposed a thin metallic coating providing a light reflective surface. Each transistor in the array of field effect address transistors is line-addressable, and the metallized membrane in each cell of the matrix array of air gap capacitors is deflectable inwardly toward the substrate in response to the signal on the address transistor corresponding thereto. Should a potential above a predetermined magnitude be placed on an individual air gap capacitor, the metallized membrane will transfer charge to the floating field plate and return to zero deflection. The floating field plate thereby not only acts as a light-blocking layer, but also prevents voltage-induced collapse of the metallized membrane to the surface of the semiconductor substrate.

43 Claims, 16 Drawing Figures

DEFORMABLE MIRROR LIGHT MODULATOR

This is a continuation of application Ser. No. 06/183,595, filed Sept. 2, 1980 now abandoned.

BACKGROUND OF THE INVENTION

This invention is directed to a spatial light modulating semiconductor device, which is line-addressed and of compact size. More particularly, the invention concerns a line-addressable spatial light modulator, wherein a deflectable metallized membrane defining a deformable mirror is mounted above a semiconductor substrate in spaced relationship with respect thereto. The membrane cooperates with a matrix array of floating conductive field plates disposed on an insulating layer covering the substrate to define an array of air gap capacitor cells addressable by an x-y matrix array of field effect address transistors formed in the substrate with the degree of membrane deflection of each air gap capacitor cell being dependent upon the signal on the corresponding field effect address transistor.

The development of a solid state spatial light modulator has been the subject of numerous research efforts in recent years. One application for such a solid state spatial light modulator is in combination with a large matrix-area charge coupled device light imager for use in obtaining real-time, two-dimensional optical transforms. As one example of past efforts in the development of a satisfactory solid state spatial light modulator, it has been proposed to locate a membrane modulator on the backside of a large matrix area charge coupled device (CCD) light imager. In this type of light modulator, electronic charge is input into the front side of the CCD imager, with the entire frame being subsequently transferred to the backside membrane modulator structure through the semiconductor substrate of thinned silicon material. This approach is subject to severe manufacturing difficulties due to the inherently low yield of manufactured low-defect, large-area metal-oxide-semiconductor (MOS) CCD devices. Further complications may arise in that device thinning and subsequent additional backside processing are required to provide the support for the membrane modulator, while flatness and the frontside CCD operation are maintained. A final complication occurs in attempting the apply the membrane to the silicon substrate and the subsequent electrical bonding to both the CCD and the membrane. This type of solid state light modulator involves device processing and patterning on both sides of the semiconductor substrate.

Heretofore, line-addressable spatial light modulators wherein an array of field effect (MOS) transistors are employed for addressing purposes have exhibited a considerable amount of fixed pattern noise which is introduced by the different threshold shifts in the analog amplifiers at the serial-to-parallel converter output.

Spatial light modulators of the membrane type are described in "The Membrane Light Modulator and Its Application in Optical Computer"-Preston, *Optica Acta*, Vol. 16, No. 5, pp. 579–585 (1969) and in "A Membrane Page Composer"-Cosentino et al, *RCA Review*, Vol. 34, pp. 45–79 (March 1973). Heretofore, membrane-type light modulators have been subject to the leakage of residual light through the metallized membrane layer to the surface of the silicon substrate, thereby producing a photo-induced charge in the depletion region of the air gap capacitor associated with the portion of the metallized membrane through which residual light is transmitted. Efforts to avoid this problem have included an increase in the thickness of the metal layer of the membrane to render the membrane more opaque to incident light. However, the thickened metal layer of the membrane structure reduces the deflection response of the membrane, thereby increasing the required operation voltages to an undesirable degree for effecting a desired membrane deflection response. Another problem with previous spatial light modulators employing deformable membrane structures as a component thereof occurs when the collapse voltage of the membrane is exceeded. In this instance, the membrane collapses into engagement with the gate oxide surface of the semiconductor substrate when the voltage applied to the membrane exceeds a predetermined magnitude, and the membrane remains bonded to the gate oxide surface even after removal of the voltage applied to the membrane.

SUMMARY OF THE INVENTION

The present invention is concerned with a spatial light modulator which is of a compact small size and is line-addressed via a CCD delay line signal input, wherein a metallized membrane defining a deformable mirror disposed in spaced relationship with respect to a semiconductor substrate of one conductivity type cooperates with an x-y matrix array of floating conductive metallic field plate members disposed on an insulating layer covering the substrate. Together, the metallized membrane and the metallic field plate members define an array of air gap capacitor cells addressable by field effect address transistors formed in the semiconductor substrate in a line-by-line addressing scheme. The metallized membrane comprises at least one thin metal layer presenting a light reflective surface to incident light mounted on a flexible non-metallic carrier layer of organic polymeric material such as nitrocellulose. The array of field effect address transistors may be formed in the semiconductor substrate in a number of different configurations but generally includes respective drain regions of the other conductivity type or opposite to that of the semiconductor substrate and common to all of the field effect address transistors arranged in a single column of the x-y matrix array of address transistors. Additionally, a second doped region of the same conductivity type as the drain region is disposed in the semiconductor substrate and extends to the same surface thereof as the drain region in spaced relationship with respect thereto, the second doped region extending substantially beneath a respective column of floating metallic field plates. An upstanding grid of conductive polycrystalline semiconductor material, such as polysilicon, is disposed on the insulating layer of the semiconductor substrate extending upwardly therefrom and overlying the respective drain regions of the other conductivity type. The metallized membrane structure is mounted upon suitable contacts applied to the upstanding grid of polysilicon material so as to be disposed in spaced relationship with respect to the individual floating metallic field plates in defining one plate of each cell included in the array of air gap capacitor cells. Light incident upon the membrane structure is essentially reflected by a surface of the metal layer thereof. The individual floating metallic field plates form the other plate of the respective air gap capacitor cells and are opaque to light such that any light leakage transmitted through the metallized membrane is prevented from depleting charge in the active regions of the array of field effect address transistors.

The membrane structure is subjected to a bias voltage of a predetermined magnitude, while the individual floating metallic field plates derive a signal input for each column or row thereof from a charge-coupled device delay line which addresses the field effect address transistors one line at a time. A decoder is connected to the plurality of air gap capacitor cells included in the other of a row or column of the matrix array, the decoder being operable to select one line of the air gap capacitor cell at a single time for readout.

Variations in the configuration of the x-y matrix array of field effect address transistors include an embodiment wherein the second doped region of the other conductivity type extends fully between the common drain regions of the other conductivity type and the channel stop region of the same one conductivity type as the substrate, thereby being disposed beneath the floating metallic field plates and partially beneath the upstanding grid of polysilicon material. Another embodiment involves a self-aligned high energy implant of a dopant material of the other conductivity type in the area between adjacent sections of the upstanding polysilicon grid structure so as to produce an implanted doped region of the other conductivity type having a first portion of increased depth below the subsequently deposited matrix array of floating metallic field plates and a shallow peripheral portion extending into engagement with the channel stop region and to the boundary of the upstanding polysilicon grid structure in spaced relationship to the drain region. Another embodiment employs buried drain regions of the other conductivity type which are implanted to a depth within the semiconductor substrate below the surface thereof on which the insulating layer is disposed. The second doped region of the other conductivity type underlying the matrix array of floating metallic field plates extends partially beneath the upstanding polysilicon grid structure in the area proximally related to the buried drain region, but is spaced from the channel stop region disposed on the opposite side thereof.

BRIEF DESCRIPTION OF THE DRAWINGS

The invention as well as other features and advantages thereof will become apparent from the following detailed description when taken in connection with the appended claims and the accompanying drawings in which:

DETAILED DESCRIPTION OF THE DRAWINGS

Figure 1:
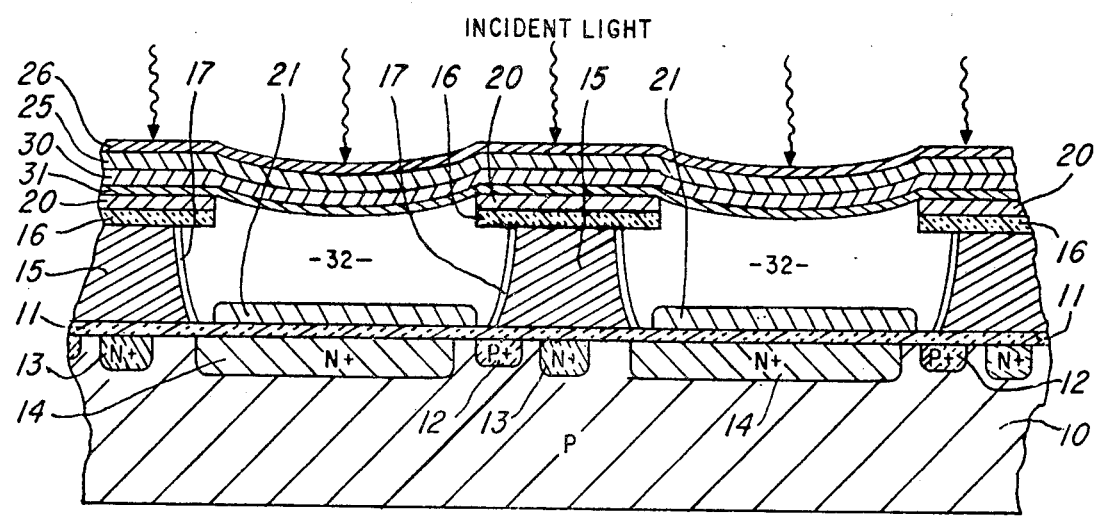
FIG. 1 is a cross-sectional view of an embodiment of a light modulating semiconductor device showing adjacent air gap capacitor cells, as constructed in accordance with the present invention.

Referring more specifically to the drawings, FIGS. 1–4 illustrate cross-sectional views of embodiments of the light modulating semiconductor device as constructed in accordance with the present invention. In FIG. 1, the light modulating semiconductor device therein illustrated comprises a substrate 10 of semiconductor material of one conductivity type, such as P-type silicon. An insulating layer 11 of silicon dioxide covers the active surface of the semiconductor substrate 10. Self-aligned P+ channel stops with an overlying thick field oxide (not shown) are formed outside of the active area of the semiconductor substrate 10. The latter moat geometry serves to keep photo-induced leakage currents out of the active surface area of the semiconductor substrate 10 and to lower lead capacitance and cross-talk. Channel stops 12 of the same conductivity type as that of the semiconductor substrate 10 but of increased dopant concentration and drain regions 13 of the other conductivity type are provided within the active surface area of the semiconductor substrate 10 by diffusion or ion implantation techniques. Thus, the channel stops 12 may be P+ regions within the P-type silicon substrate 10 and the drain regions 13 may be N+ type regions. The channel stops 12 are provided on opposite sides of the drain regions 13 in spaced relationship with respect thereto and serve to electrically isolate the drain regions 13. A second doped region 14 of the same other conductivity type (i.e. N+ conductivity) as the drain regions 13 is provided in the semiconductor substrate 10, extending generally between one of the channel stops 12 and the drain region 13 but being disposed in laterally spaced relationship with respect to the drain region 13. The second doped regions 14 of the other conductivity type cooperate with the drain regions 13 to form enhancement mode field effect address transistors arranged in an x-y matrix array and may be formed simultaneously therewith in a selective ion-implantation procedure. Appropriate contacts to the drain regions 13 which define diodes (not shown) with the semiconductor substrate 10 of opposite conductivity type are provided. The transistor gate structure for the matrix array of field effect address transistors is defined by a patterned layer of polycrystalline semiconductor material, such as polysilicon where the semiconductor substrate 10 is P-type silicon, which has been appropriately doped to be electrically conductive. The respective polysilicon transistor gate structures 15 are included within a grid configuration of polysilicon material. An insulating layer 16 of silicon dioxide is disposed atop the respective polysilicon transistor gate structures 15 which are also provided with sidewall oxide layers 17 of silicon dioxide. The respective oxide layers 16 on the polysilicon transistor gate structures 15 have overhanging marginal portions extending beyond the corresponding boundaries of the sidewalls of the polysilicon gates 15. Electrically conductive contact members or pads 20 of a suitable metal, such as gold, are provided on the respective polysilicon transistor gate structures 15, the contact members 20 being disposed on the oxide layers 16 in overlying relationship thereto and to the polysilicon transistor gate structures 15 therebeneath. An x-y matrix array of metallic field plates 21 is provided, each of the field plates 21 being disposed on the oxide layer 11 of the substrate 10 and overlying the second doped region 14 of the other conductivity type for each of the field effect address transistors of the x-y matrix array. Thus, each field plate 21 in the array of metallic field plates 21 is respectively located in registration with one of the openings provided by the polysilicon grid structure which defines the polysilicon transistor gates 15.

Completing the light modulating semiconductor device is a metallized membrane structure or deformable mirror mounted on the polysilicon grid of polysilicon transistor gate structures 15 and disposed in spaced relationship with respect to the substrate 10 and the array of metallic field plates 21. The metallized membrane structure includes a non-metallic carrier layer 25 of flexible material for supporting a light-reflective metallic coating or layer, the flexible non-metallic carrier layer 25 enabling the metallic coating or layer to be sufficiently thin for deflecting repeatedly without fatigue over a predetermined deflection range. Thus, the metallized membrane structure includes at least one metal layer which is light-reflective mounted on a non-metallic carrier layer 25 preferably formed of a polymer of nitrocellulose of the order of 800 Å thick. If only one metal layer is provided with the non-metallic carrier layer 25, the metal layer would be the lower layer for contact with the contact members or pads 20 on the transistor gate structures 15. In the particular form of the metallized membrane structure included as a component of the light modulating semiconductor device illustrated in FIG. 1, the top surface of the non-metallic carrier layer 25 of a nitrocellulose polymer has a light-reflective metal layer 26 disposed thereon, this metal layer 26 preferably being antimony of approximately 400 Å thick. A back-up metal layer is also provided on the bottom surface of the nitrocellulose carrier layer 25, the back-up metal layer being of two-ply construction and including a metal layer 30 directly adhered to the nitrocellulose carrier layer 25, preferably of the same metal, antimony, as the light-reflective top metal layer 26 and being approximately 400 Å thick. A thinner layer of non-oxidizing, low contact resistance metal 31, preferably gold, is adhered to the lower antimony layer 30 and completes the two-ply metal back-up layer affixed to the nitrocellulose carrier layer 25. The thinner gold layer 31 provides good contact to the gold contact pads 20 on the field effect address transistor gates. The metallized membrane structure including the polymer of nitrocellulose as the material of the non-metallic carrier layer 25 and at least one metal layer disposed on the bottom surface of the non-metallic carrier layer 25 is molecularly bonded to the contact members 20 of the polysilicon transistor gate structures 15 without requiring a separate bonding agent. The at least one metal layer of the metallized membrane structure serves as a field plate member in combination with the x-y matrix array of field plate members 21 disposed on the gate oxide 11 of the silicon substrate 10 which serve as the other field plates of an array of air gap capacitors, the individual air gaps 32 being defined by the space between the metallized membrane structure and the respective metallic field plate members 21 as mounted on the gate oxide 11 of the silicon substrate 10. The metallized membrane structure or deformable mirror is deflectable in response to a voltage drop across respective air gaps 32. Thus, a light modulating semiconductor device is provided in which an array of air gap capacitor cells may be line-addressed by field effect address transistors as formed on the silicon substrate 10.

Figure 2:
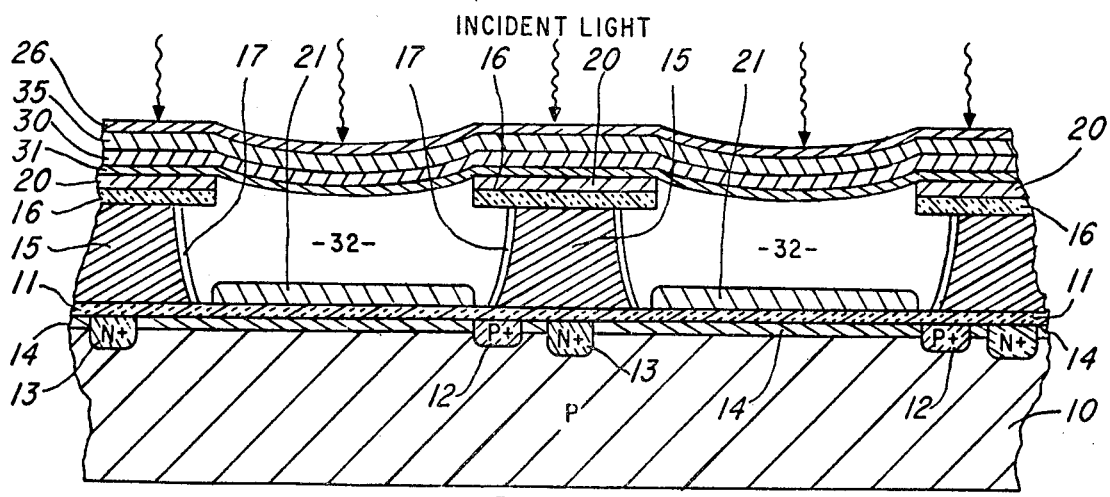
FIG. 2 is a cross-sectional view similar to that illustrated in FIG. 1, but showing another embodiment of a light modulating semiconductor device in accordance with the present invention.
Figure 4:
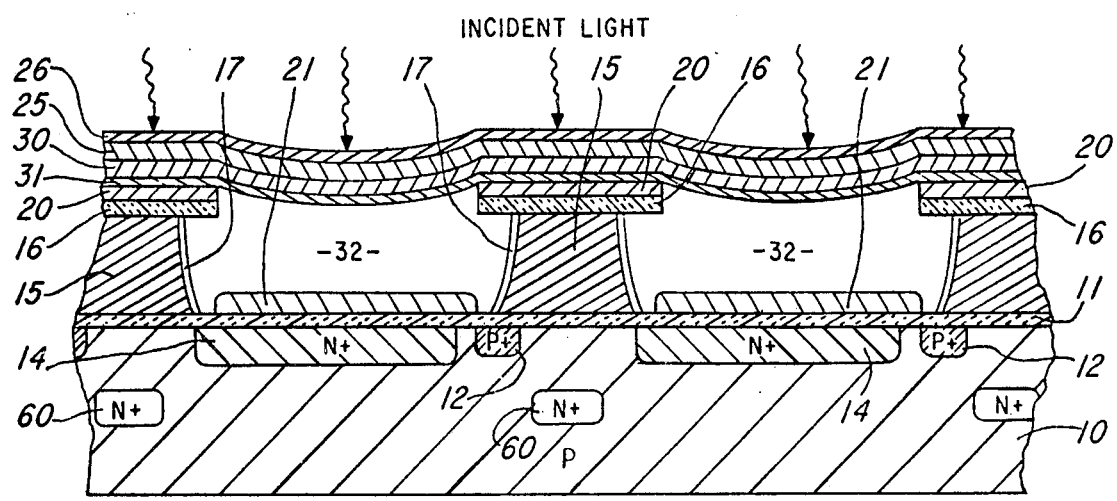
FIG. 4 is a cross-sectional view of another embodiment of a light modulating semiconductor device in accordance with the present invention.
Figure 3:
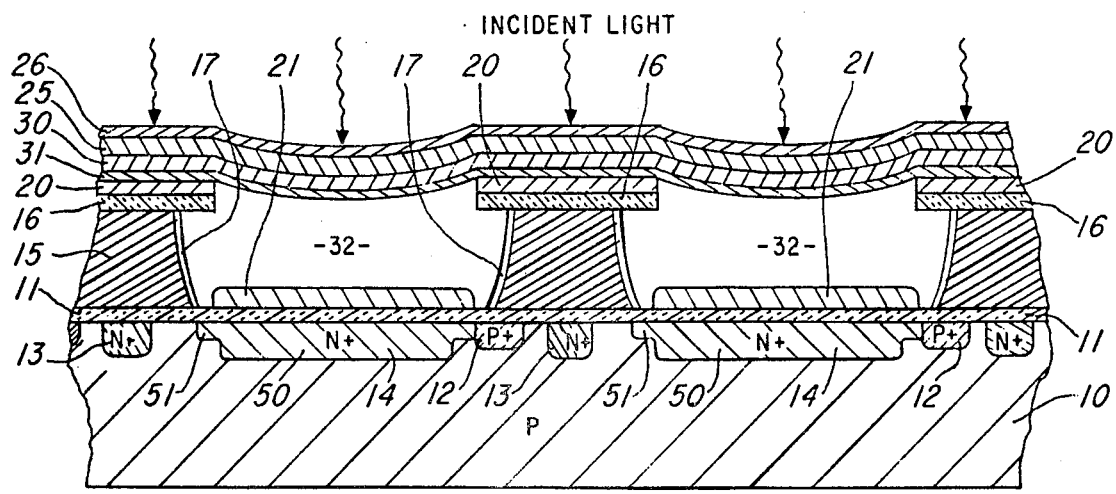
FIG. 3 is a cross-sectional view of another embodiment of a light modulating semiconductor device in accordance with the present invention.

Alternate embodiments of the light modulating semiconductor device shown in FIG. 1 are illustrated in FIGS. 2, 3 and 4, respectively. Corresponding elements in the embodiments of FIGS. 2–4 have the same reference characters of their counterparts in the embodiment of FIG. 1 to avoid repetitious description. The light modulating semiconductor device of FIG. 2 differs from that of FIG. 1 previously described in that the second doped region 14 of the other conductivity type extends completely between the drain region 13 of the other conductivity type and the channel stop region 12 of the same conductivity type as that of the silicon substrate 10 but of increased dopant concentration, whereas in the embodiment of FIG. 1, the second doped region 14 of the other conductivity type does not extend to the drain region 13, but is spaced therefrom, being in general registration with a marginal boundary of the overlying upstanding polysilicon gate structure 15. The second doped region 14 has a decreased dopant concentration as compared to the drain region 13, and the transistors operate in the field effect address depletion mode. Thus, where the drain region 13 is of N+ conductivity, the region 14 is of N conductivity. In other respects, the embodiment of FIG. 2 is the same as that shown in FIG. 1.

The FIG. 3 embodiment is similar to that of FIG. 1 but offers a self-aligned dopant implant 14 of the other conductivity type through the oxide overhang of the oxide layers 16 disposed on the polysilicon transistor gate structures 15. In this respect, each of the self-aligned second doped regions 14 of the other conductivity type (i.e., N-type) has a main body portion 50 at a substantially common depth within the silicon substrate 10 whose outline is generally commensurate with the window defined by the oxide overhang of the oxide layers 16, and further includes lateral marginal portions 51 of shallow depth which respectively extend into general registration with the corresponding boundaries of the respective overlying polysilicon transistor gate structures 15. The main body portion 50 of the doped region 14 has a dopant concentration less than that of the drain region 13 but of greater dopant concentration than the doped region 14 of the embodiment of FIG. 2. The shallow lateral marginal portions 51 of the doped region 14 have a dopant concentration of the same order as that of the doped region 14 of the embodiment of FIG. 2.

The embodiment of FIG. 4 differs from the embodiments of FIGS. 1-3 in that the drain regions are formed as buried drain regions 60 of the other conductivity type which are located below the surface of the silicon substrate 10 in spaced relationship with respect to the gate oxide 11. In this version of the light modulating semiconductor device, the second doped region 14 of the other conductivity type has a dopant concentration essentially comparable to that of the buried drain regions 60 and is spaced from the channel stop regions 12 located on opposite sides thereof.

Each of the embodiments of FIGS. 1, 3 and 4 relies upon enhancement mode field effect address transistors, whereas the FIG. 2 embodiment provides transistors operating in the depletion mode. By way of specific examples, the P-type silicon substrate 10 of each of the embodiments of FIGS. 1-3 had an impurity concentration of $1.5 \times 10^{15}$ cm$^{-3}$ producing a resistivity of the order of 9 ohm-cm and the P+ channel stops 12 were formed therein by a selective ion implantation of boron conducted at 30 KeV and a dosage of $1 \times 10^{15}$ cm$^{-2}$. In the FIG. 1 embodiment, the N+ drain regions 13 and doped regions 14 were formed simultaneously with substantially equal depths by a selective ion implantation of phosphorus conducted at 100 KeV and a dosage of $2 \times 10^{15}$ cm$^{-2}$. In the embodiments of FIGS. 2 and 3, the N+ drain regions 13 were similarly formed by selective ion implantation of phosphorus conducted at 100 KeV and a dosage of $2 \times 10^{15}$ cm$^{-2}$, with the doped regions 14 thereof being separately formed—by ion implantation of arsenic at 180 KeV and a dosage of $1.5 \times 10^{12}$ cm$^{-2}$ in the FIG. 2 embodiment; and by ion implantation of phosphorus at 360 KeV and a dosage of $1 \times 10^{13}$ cm$^{-2}$ in the FIG. 3 embodiment. The embodiment of FIG. 4 would have respective dopant levels for the substrate 10, the channel stops 12, the buried drain regions 60 and the doped regions 14 approximating the dopant levels of the comparable components in the embodiment of FIG. 1.

Figure 5A:
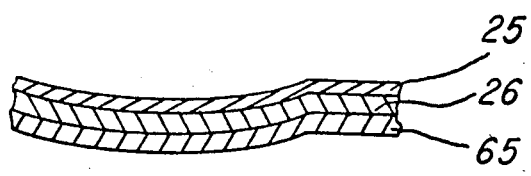
FIGS. 5a–5c are fragmentary cross-sectional views of alternate forms of the deflectable membrane structure or deformable mirror comprising a component of the light modulating semiconductor device as illustrated in any one of FIGS. 1–4.
Figure 5B:
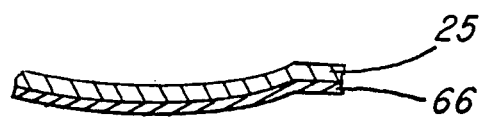
Figure 5C:
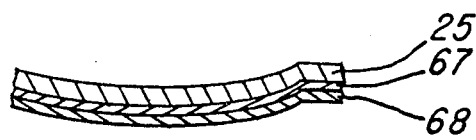

The metallized membrane structure or deformable mirror for each of the embodiments illustrated in FIGS. 1-4, respectively, may take alternate forms, as illustrated in FIGS. 5a-5c. Thus, in the metallized membrane of FIG. 5a, the back-up metal layer for the non-metallic polymer of nitrocellulose comprising the carrier layer 25 may be a single metal layer 65 of antimony or gold. The top metal layer 26 of antimony which covers the carrier layer 25 provides the light-reflective surface. The metallized membrane of FIG. 5b is a two layer structure, including the nitrocellulose carrier layer 25 and a single thin metal layer 66 of antimony adhered to the backside thereof and providing the light-reflective surface of the metallized membrane structure. FIG. 5c shows yet another variation of the metallized membrane structure, wherein the nitrocellulose carrier layer 25 is backed by a two-ply metal back-up layer including an antimony layer 67 directly adhered to the nitrocellulose carrier layer 25, and a thin gold layer 68 adhered to the antimony layer 67 to present a substantially non-oxidizing, low contact resistance metal layer for engagement with the gold contact members 20 on the upstanding grid of polysilicon transistor gate structures 15. In this respect, the metallized membrane structure of FIG. 5c is the same as that illustrated for the membrane structures of each of the embodiments of FIGS. 1-4, with the top metal layer 26 removed such that the layer 67 of antimony which is the top layer of the composite backup layer adhered to the nitrocellulose carrier layer 25 provides the light-reflective surface of the membrane structure.

Figure 6:
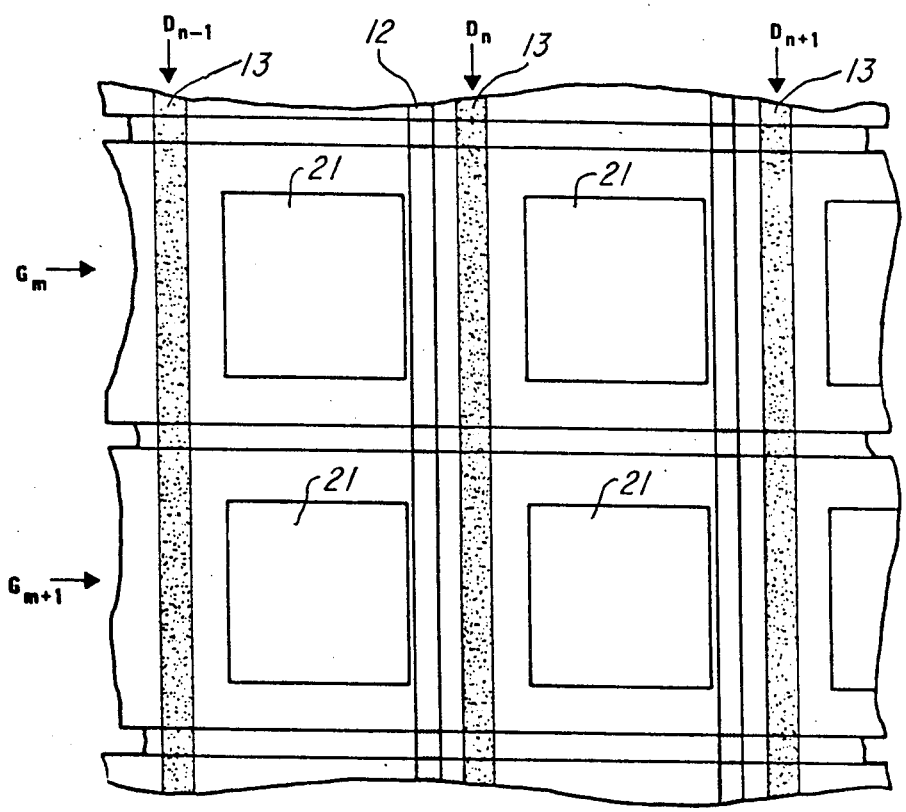
FIG. 6 is a plan view of the light modulating semiconductor device of any one of FIGS. 1–4 with the membrane structure removed therefrom for purposes of clarity.

Referring to FIG. 6, a plan view applicable to all four embodiments of the light modulating semiconductor device of FIGS. 1-4 is illustrated, with the metallized membrane structure being removed to show the common vertical drain regions 13 alternating with the vertical channel stop regions 12 of opposite conductivity with respect thereto, and having the matrix array of metallic field plate members 21 indicative of the individual air gap capacitors disposed between the vertical drain regions 13 and channel stop regions 12. The polysilicon transistor gate structures 15 are configured as a grid with a matrix of openings being provided therein to define the individual air gaps of the respective air gap capacitor cells and generally commensurate with the underlying metallic field plate members 21.

Figure 7:
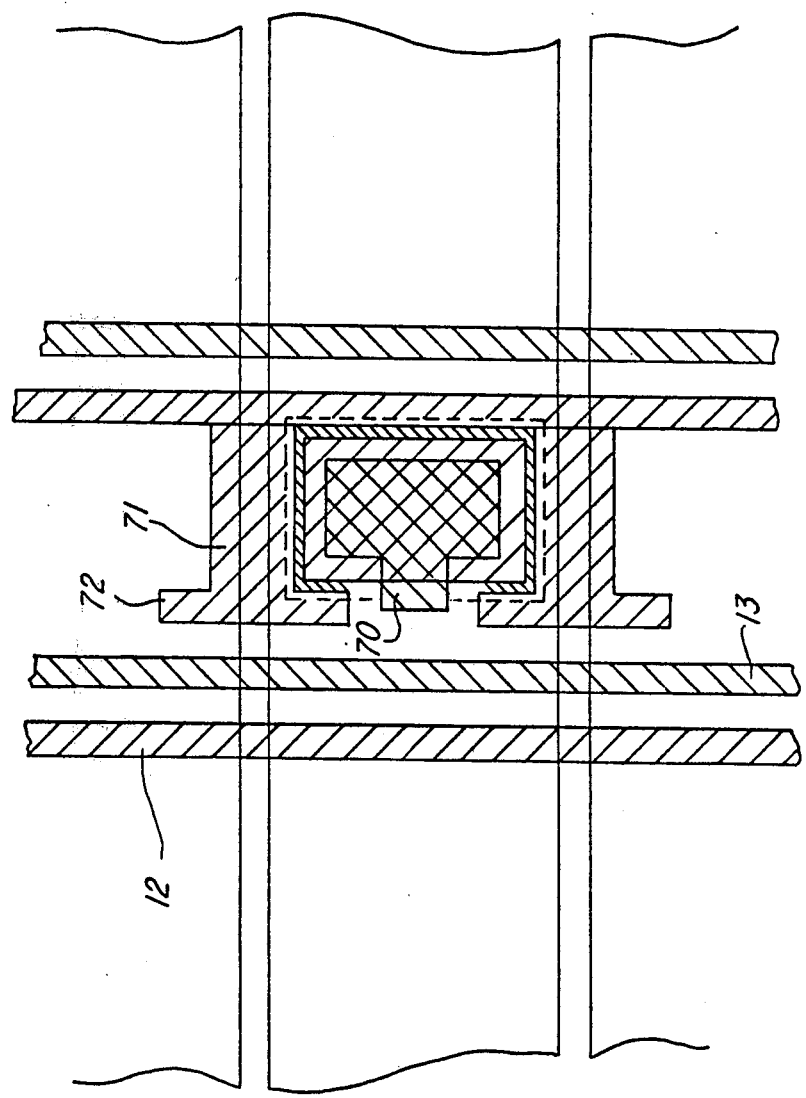
FIG. 7 is a plan view, similar to FIG. 6, but of a modified version of the light modulating semiconductor device of FIG. 1.

A modified version of the air gap capacitor cell array provided by the embodiment of FIG. 1 is illustrated in the plan view of FIG. 7, wherein the implanted second dopant region 14 of the other conductivity type included in each air gap capacitor cell is configured to lie wholly within the boundaries of the overlying field plate member 21 except for a laterally extending zone 70 thereof which terminates at a marginal edge located below the polysilicon transistor gate structure 15, but slightly beyond the oxide overhang of the oxide layer 16 disposed atop the polysilicon transistor gate structure 15. Because of the rectangular shape of the air gap windows in the polysilicon grid in the modified plan view of FIG. 7, the remaining amount of polysilicon material may be insufficient to prevent cross-talk between adjacent transistors. To avoid the cross-talk problem, the vertical channel stop regions 12 are modified to include lateral extensions 71 between successive air gap capacitor cells in the same column, the lateral extensions 71 of the channel stop 12 terminating in cross-arms 72 which are vertically arranged. Thus, the modified channel stop region 12 with its lateral extensions 71 and vertical cross-arms 72 provides effective electrical isolation of each air gap capacitor cell included in the array of such cells about three sides thereof, being open only on the side of the cell which includes the lateral zone 70 of the second dopant region 14 of the other conductivity type which extends toward the vertical drain region 13 of the other conductivity type. The modified channel stop region 12 illustrated in FIG. 7 is also applicable to each of the embodiments of the light modulating semiconductor device shown in FIGS. 2-4, but the complete plan view of FIG. 7 is applicable to the embodiment of FIG. 1 only.

Fabrication of the light modulating semiconductor devices of FIGS. 1-4 generally proceeds in the same manner as exemplified by the following description concerning the fabrication of the light modulating semiconductor device of FIG. 1. A P-type silicon slice serves as the substrate 10 and has self-aligned P+ channel stops with an overlying thick field oxide (not shown) formed thereon outside of the active surface area. A self-aligned patterning and deposition technique is then employed to produce the implanted P+ channel stops 12 of the same conductivity type as that of the substrate 10 but of increased dopant concentration and the N+ drain regions 13 and N+ regions 14 within the active surface area of the substrate 10. The N+ drain regions 13 and the N+ doped regions 14 are simultaneously formed in the substrate 10 by ion implantation. It will be understood that separate ion implantation procedures for forming the drain regions 13 and the doped regions 14 are required in fabricating the embodiments of FIGS. 2, 3 and 4. In the FIG. 1 embodiment, the N+ doped regions 14 cooperate with the N+ drain regions 13 to form enhancement mode field effect address transistors arranged in an x-y matrix array. Gate oxide, i.e. silicon dioxide, comprising the insulating layer 11 is then grown to cover the active surface area of the substrate 10. Thereafter, contacts to the drain regions 13 which define diodes with the substrate of opposite conductivity type are provided. A layer of polycrystalline semiconductor material, such as polysilicon, is then grown over the gate oxide layer 11 of the substrate 10 and appropriately doped to be electrically conductive. The polysilicon layer is then patterned and etched, such as by suitable plasma etching, to define the transistor gate pattern and bus lines. The silicon dioxide insulating layer 11 forming the original gate oxide is now exposed between the polysilicon transistor gates 15. The exposed portion of the original gate oxide is stripped, and a second gate oxide of silicon dioxide is then grown to cover the exposed portion of the silicon substrate 10 and the patterned polysilicon. The air gap openings are then etched into the polysilicon oxide, and this oxide 16 is then used as an etch mask for the polysilicon. The polysilicon is etched to define a grid-like polysilicon structure, such as by a suitable plasma etching procedure, down to the level of the first gate oxide 11 which acts as an etch stop. The etching procedure causes an overetch, thereby serving to define the oxide overhang of the portions of the oxide layer 16 that frame the respective air gap windows. Thus, a lower level silicon dioxide layer 11 is provided on the silicon substrate 10 and a higher level silicon dioxide layer 16 is provided on the polysilicon transistor gate structures. The respective portions of the oxide layer 16 which overlie corresponding polysilicon gates 15 have overhanging marginal portions extending beyond the boundaries of the polysilicon gates 15. Thereafter, the sidewalls of the etched polysilicon transistor gate structures 15 are lightly reoxidized to form the sidewall oxide layers 17 of silicon dioxide.

Contacts are provided for the polysilicon grid structure by appropriate photolithographic procedures. Bond pads (not shown) are suitably formed by depositing and patterning a metal layer, such as aluminum or gold, and a polysilicon transistor gate serving as a membrane contact gate and running parallel to the last polysilicon transistor gate, has a metal layer formed thereon at the same time as the contact pads 20 and the field plate members 21 are formed (as hereinafter described) which provides electrical contact between one of the bond pads and a metal layer of the metallized membrane structure.

Figure 12:
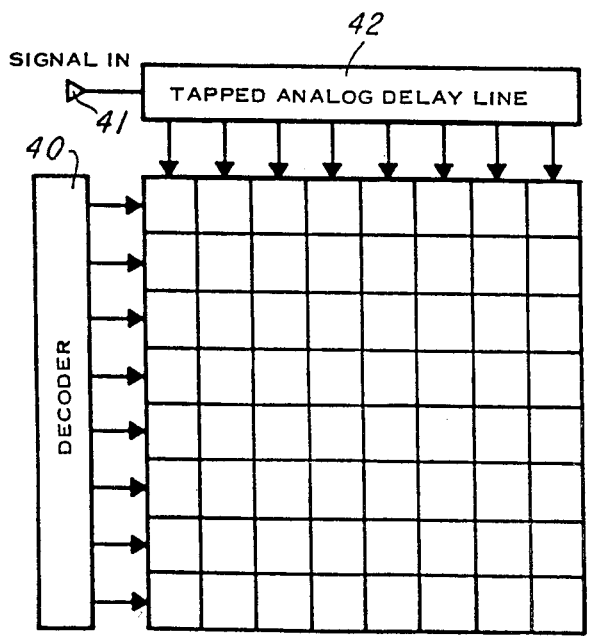
FIG. 12 is a block diagram of a spatial light modulator employing a matrix array of air gap capacitor cells as respectively defined by the light modulating semiconductor device as illustrated in any of FIGS. 1–4.

The contact pads 20 on the polysilicon transistor gates 15 and the x-y matrix array of metallic field plates 21 are then formed simultaneously by depositing a thin layer of metal, such as gold, by vacuum evaporation over the entire assembly. The thin layer of gold is not patterned within the active surface area of the silicon substrate 10, but is etched away in the regions overlying the thick field oxide. Since the layer of gold is thin as compared to the dimension of the air gap 32 extending from the gate oxide layer 11 covering the silicon substrate 10 to the level of the oxide layers 16 of the polysilicon transistor gate structures 15, the oxide overhang provided by the oxide layers 16 is not step-covered by the gold deposition. Instead, the oxide overhang of the oxide layers 16 shadows the gold evaporation, causing the gold deposit to break into two levels, one level forming the floating metallic field plates 21 and the other level forming the membrane contact pads 20. This aspect is best illustrated in FIG. 12.

Fabrication of the metallized membrane structure is accomplished by initially placing a metal support ring on a wire mesh screen. The metal support ring is then placed under the casting medium which is filtered distilled water. A filtered solution of 5% nitrocellulose in amyl acetate is cast on the surface of the water, where it spreads to a thin uniform layer. The amyl acetate is then volatized to leave the polymer membrane of nitrocellulose with a typical thickness of 800 Å. The wire mesh screen containing the metal support ring is raised to the surface of the water, and as it is lifted out of the water, the floating membrane adheres to the metal ring and wire screen. The polymer membrane is dried in a nitrogen atmosphere and the excess material draped over the edges of the support ring is removed to free the polymer membrane and the support ring from the wire screen, thereby producing a nitrocellulose membrane approximately 800 Å thick stretched on a support ring with a built-in tension of approximately 2 N/m. The polymer membrane is then placed in a metal evaporator and aligned to a shadow mask, and the metal layers are then applied thereto to produce any of the metallized membrane structures as illustrated in FIGS. 1–4 and the variations shown in FIGS. 5a–5c. Antimony is preferably used as the metal in direct adherence to the nitrocellulose carrier layer because of its compatibility with nitrocellulose membranes.

Figure 8:
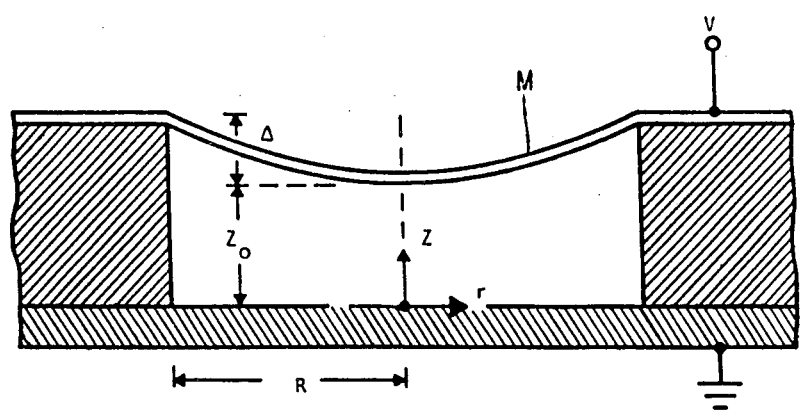
FIG. 8 is a cross-sectional view illustrating a theoretical circular membrane model for predetermining membrane deflection.

Referring to FIG. 8, a cross-sectional view of a circular membrane model is illustrated as a theoretical model for membrane deflection. The deflection model begins with an ideal stretched membrane M under constant tension with an opposing electrostatic force of attraction. It is assumed that (a) the membrane M has negligible stiffness, i.e., only tension acting tangentially need be considered; (b) the tension $T_o$ may be considered constant, independent of the amount of deflection, i.e., small deflections and large initial built-in tension; and (c) electrostatic end effects may be neglected. A mathematical equation for solving this problem appears in "A Digital-Optical Hybrid Correlator"-Meyer et al, TG 1193A, Johns Hopkins University, Md, 1972 assuming a circular membrane support boundary of radius R and the coordinate system and boundary conditions as shown in FIG. 8. In cylindrical coordinates, the membrane in static equilibrium obeys the following differential equation:

$$\frac{d^2Z}{dr^2} + \frac{1}{r}\frac{dZ}{dr} = -\frac{\epsilon_o V^2}{2T_o Z^2} \qquad (1)$$

where
  V = voltage between membrane and substrate,
  $T_o$ = membrane tension, and $\epsilon_o$ = dielectric constant of air.

The collapse voltage, or point of unstable equilibrium for the membrane, is given by $$V_c^2 = \frac{1.58 \times 10^{-6} D^3 T_o}{\epsilon_o R^2} \quad \text{(II)}$$

where

D = air gap, and

R = radius of support boundary.

D and R are in micrometers and $T_o$ is in N/m. The peak deflection of the membrane at the collapse condition is given by the equation;

$$\Delta_C = 0.44 D. \quad \text{(III)}$$

Figure 9:
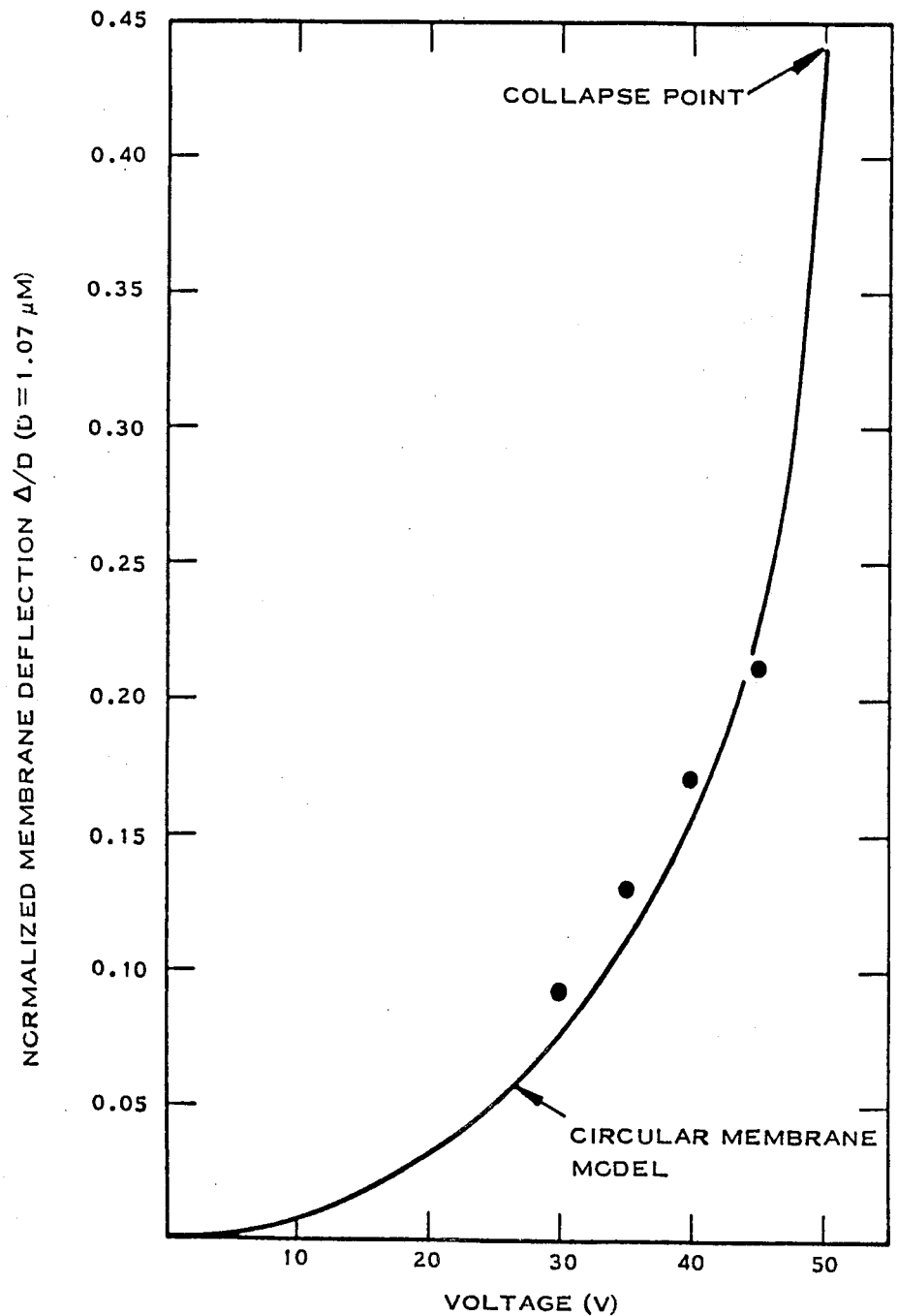
FIG. 9 is a graph of membrane deflection versus applied voltage with respect to the circular membrane model as illustrated in FIG. 8.

Thus, the membrane can deflect up to 44% of the air gap dimension and remain stable. Applying this analysis as to membrane deflection, data as shown in the graph of FIG. 9 was generated in a test structure utilizing a non-addressable floating field plate structure having square 25 μm openings on 41 μm centers and an air gap of 1.07 μm. Using this data, an optimum membrane tension was determined from equation (I) to be 1.9 N/m. The collapse voltage is 50 V, and the membrane deflection at collapse is 4700 Å.

Figure 10:
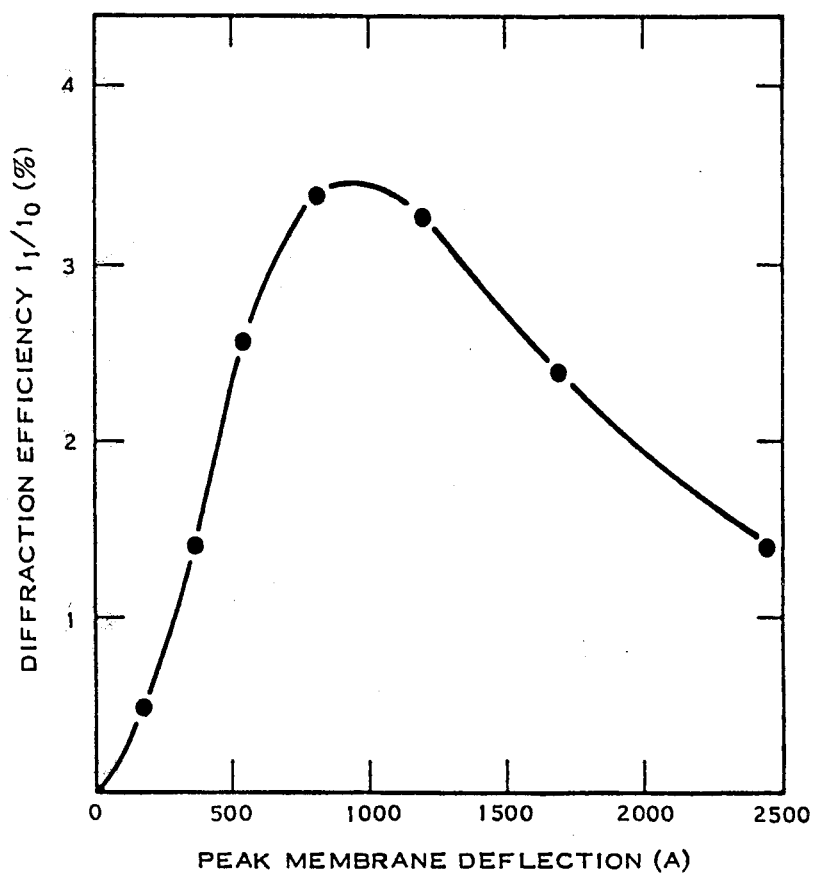
FIG. 10 is a graph showing the diffraction efficiency of the first order diffraction spot plotted as a function of the peak membrane deflection.
Figure 11:
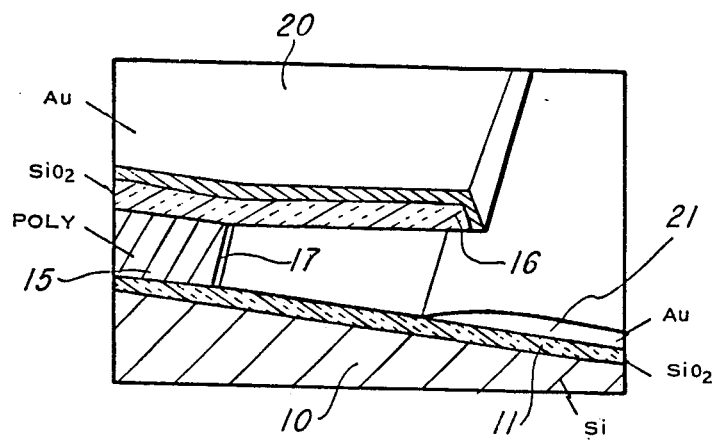
FIG. 11 is an enlarged fragmentary perspective view, partially in cross-section, and showing the support structure for the membrane and the floating field plate comprising components of the light modulating semiconductor device of any of FIGS. 1–4.

In another test, approximately 500 air gap capacitor cells were illuminated with a He-Ne laser to produce far field diffraction patterns as a function of applied voltage. FIG. 10 is a graph plotting the diffraction efficiency of the first order diffraction spot as a function of peak membrane deflection, where the diffraction efficiency is defined as the ratio of power in the first-order spot to the power in the incident laser beam. The detector area for the measurements was chosen equal to the diffraction limited spot size. A peak diffraction efficiency of 3.4% is achieved at 30 V, with the signal-to-noise ratio being 37 dB at the peak diffraction efficiency. The signal-to-noise ratio is defined as peak signal to zero voltage signal measured at the first-order diffraction spot. The low zero voltage signal demonstrates the high flatness of the membrane and the low level of periodic membrane distortions at the cell period.

The electrical operation of the individual air gap capacitor cells included in the array as defined by the light modulating semiconductor device of any of FIGS. 1-4 requires AC operation. AC operation is necessary because of the existence of an intense electric field ($\sim 10^5$ V/cm) in the respective air gaps 32 of the cells. Although breakdown of the air does not occur because of the small spacing of the electrodes ($\sim 1$ μm), ions can be transported across the air gap 32 and after a period of time, sufficient charge can build up on the floating field plate 21 to neutralize the applied field. The time required to neutralize an applied field of 20 V varies from several hours to many days. To avoid slow changes in modulator sensitivity with time, it is necessary to periodically reverse the applied field across the air gap 32 so that no net charge migration across the air gap 32 can occur. Secondly, AC operation is necessary because of threshold variation in the tapped charge coupled device analog delay line providing the signal input (as described hereinafter) and the field effect address transistors. These threshold variations give rise to a fixed DC offset that varies from cell to cell. By operating the light modulator in an AC mode, these offsets can be eliminated by the neutralizing effect of charge migration across the air gap 32 to the floating field plate 21.

By way of explanation, the metallized membrane structure may be biased at a fixed voltage level $V_M$. AC operation is accomplished by alternately setting the surface potential $\phi_s$ of the silicon substrate 10 at $V_M + V_{sig}$ during one frame and then $V_M - V_{sig}$ for the next frame. In this manner, the voltage drop across the air gap 32 periodically alternates from $+V_{sig}$ to $-V_{sig}$. Since the deflection of the membrane is proportional to the square of the voltage drop across the air gap 32, the reversal of the field has no effect on the magnitude of the deflection. Thus, AC operation is achieved by alternately adding and subtracting the input signal from a fixed biased level before it is injected into the tapped delay line.

Figure 13:
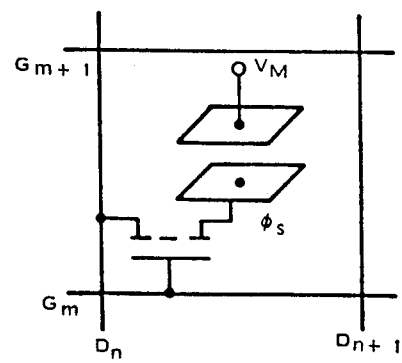
FIG. 13 is a schematic electrical diagram of one of the air gap capacitor cells of the array included in the spatial light modulator of FIG. 12.

Referring to FIG. 12 a block diagram of the spatial light modulator employing the light modulating semiconductor device of FIG. 1 is illustrated, with FIG. 13 showing an electrical schematic of an individual air gap capacitor cell as included in the matrix array of air gap capacitor cells defined by the light modulating semiconductor device. The N+ drain regions 13 of the light modulating semiconductor device shown as vertical lines in FIG. 12 set the potential of the silicon surface of the substrate 10 beneath the deflectable membrane field plate comprising the upper metal layer 26 and the two-ply metal back-up layer 30, 31 on opposite sides of the flexible nitrocellulose carrier layer 25. The gate lines as defined by the grid of polysilicon transistor gate structures 15 shown as horizontal lines in FIG. 12 serve to select a particular line for input by a decoder 40, while the other air gap capacitor cells in different lines are "off". A serial signal input 41 is provided to a charge coupled device tapped analog delay line 42 which may be of the type disclosed in U.S. Pat. No. 3,997,973 Buss issued on Dec. 21, 1976 and containing a parallel storage section to allow simultaneous signal data input while the previous signal is being applied to the drain regions 13. The decoder 40 selects a particular line and may be accessed either sequentially or randomly. Operation of the spatial light modulator is achieved by inputting an analog signal, as at 20 MHz, for example. The signal data is then parallel-dumped via the analog delay line 42 into the drain regions 13 of the air gap capacitor array, and the selected decoder line of the decoder 40 is activated. Thus, an entire line of data is written simultaneously. As soon as one line of data has been inputted into the tapped delay line 42, it is dumped into a storage register to make room for entry of the next line. The storage register is coupled to line drivers which, in turn, are connected to each of the drain lines $D_n$, $D_{n+1}$, etc. (FIG. 13). While the next line is being inputted into the tapped delay line 42, all of the drain regions 13 are simultaneously charged to voltage levels proportional to the signal levels inputted for the previous line. When the drain voltage levels have been set, the decoder 40 selects and turns on a gate line $G_m$, thus turning on all transistors in that line. This, in turn, causes the silicon side of the air gap capacitors in that line to charge to the drain voltage levels $(V_d)_{nm}$. The gate for that line is then turned off, and the capacitors in that line remain charged at voltage levels $(V_d)_{nm}$. The metallized membrane is maintained at a fixed bias voltage level $V_M$. Thus, the voltage drop across each air gap capacitor in line m is $V_M - (V_d)_{nm} = \Delta V_{nm}$. The metallized membrane is displaced toward the surface of the silicon substrate 10 according to the absolute magnitude of $\Delta V_{nm}$. This addressing sequence is repeated one line at a time at a continuous input data rate.

Figure 14:
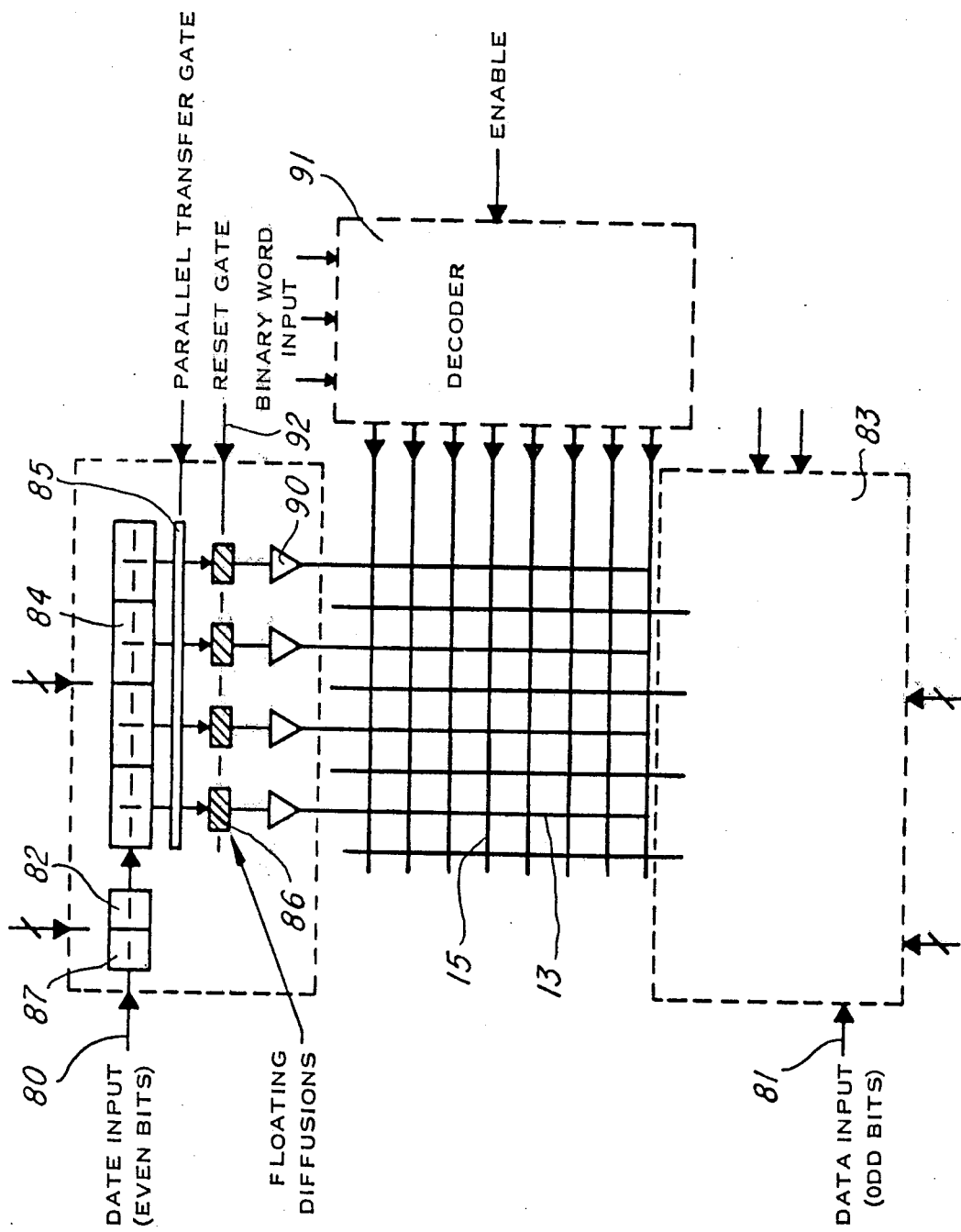
FIG. 14 is a block diagram of a spatial light modulator similar to FIG. 12, but showing further details of the line-addressed spatial light modulator organization.

FIG. 14 is a block diagram of a spatial light modulator modified from the version shown in FIG. 12 in that the analog delay line 42 has been split into a top and bottom section for increased speed and flexibility. To this end, the modified spatial light modulator of FIG. 14 includes separate signal inputs 80, 81 respectively connected to first and second tapped analog delay lines 82, 83. The input analog data signal stream is sampled and switched alternately to the first and second analog delay lines 82 and 83 such that the first analog delay line 82 receives even data bits as a signal input and the second analog delay line 83 received odd data bits as a signal input. In each instance, the input signal data is shifted along a 4-phase, peristaltic CCD shift register 84 of the respective first and second analog delay lines 82, 83. When the shift register 84 has been filled, the clock pulses are stopped and a parallel transfer gate 85 is activated momentarily to shift the data from the CCD shift register 84 onto a set of floating diffusions 86. Each of the first and second analog delay lines 82 and 83 is provided with an extra cell 87 at the input to the shift register 84 which continues to be clocked. When the signal data in this extra cell 87 reaches the input of the shift register 84, transfer of the previous line of data from the shift register 84 via the parallel transfer gate 85 to the set of floating diffusions 86 has been completed, and the parallel transfer gate 85 has been turned off. As the next line of data is fed into the shift register 84, the drain lines of the array of field effect address transistors are charged by line driver amplifiers 90 to voltage levels proportional to the amount of charge dumped onto the floating diffusions 86. When the drains 13 have been charged to their final levels, a binary word is input to a decoder 91, and a particular gate line 15 is selected and momentarily pulsed. This causes the voltage levels present on the drain lines 13 to be stored on the membrane air gap capacitor cells. Just before the next line of data is dumped onto the floating diffusions 86, they are reset to a reference level by a reset gate 92 and a diffusion drain line (not shown).

In the light modulator shown in FIG. 14, each shift register 84 of the respective first and second analog delay lines 82 and 83 operates at one-half the overall data rate, and the parallel transfer of data to the floating diffusions 86 is accomplished in the time required to transfer in the next odd (or even) bit. However, the operation of charging the drain lines 13, pulsing the appropriate gate 15, and resetting the floating diffusion 86 may occupy an entire line time. Assuming a data rate of 20 MHz for an array of air gap capacitor cells 250×250, the shift registers 84 for the respective first and second analog delay lines 82 and 83 are operable at 10 MHz, and the parallel transfer may occur in 100 ns. However, the rest of the line-addressed sequence can require over 10 μs. Thus, it is not necessary that the reset transistors and line driver amplifiers have a high bandwidth. Also, the long transistor diffusions driving the modulator cells are readily chargeable during the time available.

In each of the disclosed embodiments of the light modulating semiconductor device shown in FIGS. 1–4, floating metallic field plates 21 are provided as components of the array of air gap capacitor cells. These metallic field plates 21 are opaque to light, thereby blocking light from the silicon charge storage region as defined by the second doped region 14 of the other conductivity type. In addition, the metallic field plates 21 also prevent accidental voltage-induced, catastrophic collapse of the metallized membrane to the gate oxide 11 of the silicon substrate 10. In this respect, if the potential placed on the air gap capacitor exceeds a predetermined magnitude, the metallized membrane may be deflected into contact with the metallic field plate 21, thereby transferring charge to the field plate 21 and returning to zero deflection. As previously described, the contact members or pads 20 atop the upstanding polysilicon transistor gate structures 15 of the polysilicon grid configuration and the array of metallic field plates 21 are formed by a single evaporation of gold over the entire assembly which breaks into two levels over the oxide overhang provided by the oxide layers 16 framing the perimeters of the air gaps 32. The lower level of gold is deposited on the surface of the gate oxide 11, forming the array of floating metallic field plates 21, and the upper level of gold is deposited over the oxide layers 16 on the polysilicon transistor gate structures 15, thereby forming the contact pads 20 for receiving the metallized membrane structure. The oxide overhang of the oxide layers 16 which causes the gold evaporation to break into two levels also serves an additional function by reducing the interaction between the polysilicon transistor gate structures 15 and the metallized membrane structure which is present because of the manner in which the spatial light modulator is normally operated. In the latter respect, the polysilicon transistor gates 15 are zero biased (FIGS. 1, 3 and 4) or negatively biased (FIG. 2) with respect to the silicon substrate 10 to keep the field effect address transistors turned off. However, the metallized membrane is maintained at a positive bias, thereby being attracted to the polysilicon transistor gates 15. The contact pads 20, being biased at the membrane voltage and overhanging the polysilicon transistor gates 15, electrostatically shield the membrane from the gates, thereby reducing the amount of fixed deflection of the membrane and enhancing its dynamic range in the transform plane.

The deposition of the floating metallic field plates 21 as accompanied by the deposition of the contact members or pads 20 automatically causes the contact members 20 to form a self-aligned layer serving as a smooth membrane contact atop the polysilicon transistor gates 15, with the membrane contact 20 surrounding each air gap capacitor cell. Thus, the metal layer of the membrane structure in engagement with the contact members 20 is only required to provide conduction across one opening of an air gap capacitor cell. It is therefore possible to increase the sheet resistance of the membrane metallization, which permits any metal layers included in the membrane structure to be made thinner, resulting in improved membrane deflection response and lower operating voltages. The contact members or pads 20 as fabricated in the manner described simultaneously with the floating metallic field plates 21 are formed smoothly and with an essentially flat surface, thereby maintaining a flat membrane support surface to reduce fixed pattern noise in the transform plane.

While the semiconductor substrate 10 has been described as being of P-type conductivity, with N-type drain regions 13 and N-type doped regions 14, it will be understood that the substrate 10 may be of N-type conductivity, with P-type drain regions 13 and P-type doped regions 14 within the spirit of this invention.

Although the invention has been described with respect to specific preferred embodiments thereof, it will be understood that variations and modifications can be made within the scope of the invention by those skilled in the art. Therefore, it is intended that the appended claims be interpreted as broadly as reasonably permitted by the prior art to include all such variations and modifications within the scope of the present invention.

What is claimed is:

1. A light modulating semiconductor device comprising:
   a semiconductor substrate of one conductivity type;
   a layer of insulating material disposed on one surface of said substrate;
   a first doped region of the other conductivity type disposed in said substrate;
   a member of conductive material disposed on said insulating layer above said first doped region of the other conductivity type and extending upwardly from said substrate;
   membrane means including at least one conductive layer disposed upon said conductive member and extending across said substrate in spaced relationship with respect to said insulating layer, said membrane means having a light reflective surface exposed to incident light;
   a conductive element disposed on said insulating layer and overlying said substrate in offset relationship with respect to said first doped region of the other conductivity type and said conductive member extending upwardly from said substrate;
   a second doped region of the other conductivity type disposed in said substrate and extending to said one surface thereof, said second doped region of the other conductivity type being substantially disposed beneath said conductive element and spaced therefrom by said insulating layer interposed therebetween;
   said conductive element being spaced from said membrane means so as to define an air gap therebetween, said conductive element and said conductive layer of said membrane means respectively serving as opposed field plates with the air gap therebetween to comprise an air gap capacitor; and
   said membrane means being deflectable in a direction toward said conductive element in response to the charge placed on said air gap capacitor.

2. A light modulating semiconductor device as set forth in claim 1, wherein said first doped region of the other conductivity type extends to said one surface of said substrate.

3. A light modulating semiconductor device as set forth in claim 2, wherein said second doped region of the other conductivity type is disposed in spaced relationship with respect to said first doped region of the other conductivity type.

4. A light modulating semiconductor device as set forth in claim 3, wherein said second doped region of the other conductivity type extends within said substrate beyond the perimeter of said conductive element so as to include a portion thereof underlying the space defined between said conductive member and said conductive element by virtue of the offset relationship between said conductive member and said conductive element.

5. A light modulating semiconductor device as set forth in claim 3, wherein said second doped region of the other conductivity type includes marginal portions of reduced depth as compared to the remainder of said second doped region of the other conductivity type.

6. A light modulating semiconductor device as set forth in claim 2, wherein said second doped region of the other conductivity type extends partially beneath said conductive member into said first doped region of the other conductivity type and has a decreased dopant concentration as compared thereto.

7. A light modulating semiconductor device as set forth in claim 1, wherein said first doped region of the other conductivity type is disposed in said substrate in buried relationship below said one surface thereof and beneath said upwardly extending conductive member.

8. A light modulating semiconductor device as set forth in claim 1, wherein said membrane means comprises first and second metal layers and a flexible non-metallic carrier layer interposed therebetween to form a composite membrane structure.

9. A light modulating semiconductor device as set forth in claim 8, wherein the metal layer of said membrane means proximally related to said conductive member is a composite two-ply metallic layer including an uppermost back-up metal layer in engagement with said non-metallic carrier layer of said membrane means and a lower metallic layer of a metal material exhibiting resistance to oxidation and low contact resistance.

10. A light modulating semiconductor device as set forth in claim 9, wherein said non-metallic carrier layer of said membrane means is an organic polymer.

11. A light modulating semiconductor device as set forth in claim 10, wherein said carrier layer of organic polymeric material of said membrane means is nitrocellulose.

12. A light modulating semiconductor device as set forth in claim 11, wherein said first metal layer and said uppermost back-up metal layer of said membrane means are antimony and said lower metallic layer is gold.

13. A light modulating semiconductor device comprising:
    a semiconductor substrate of one conductivity type;
    a layer of insulating material disposed on one surface of said substrate;
    means defining a matrix array of transistors in said substrate including a plurality of spaced parallel elongated doped regions of the other conductivity type disposed in said substrate;
    a plurality of conductive members respectively corresponding to said elongated doped regions of the other conductivity type and disposed on said insulating layer above the corresponding one of said plurality of parallel doped regions of the other conductivity type and extending upwardly from said substrate;
    membrane means including at least one conductive layer disposed over said substrate and contacting said plurality of conductive members, said membrane means being disposed in spaced relationship with respect to said insulating layer, said membrane means having a light reflective surface and being exposed to incident light;
    a matrix of spaced apart conductive elements arranged in rows and columns on said insulating layer and overlying said substrate in offset relationship with respect to said parallel elongated doped regions of the other conductivity type and respectively disposed between successive ones of said plurality of upwardly extending conductive members;
    said matrix of conductive elements being spaced from said membrane means so as to define an array of air gaps therebetween in cooperation with said upwardly extending plurality of conductive members;

said conductive layer of said membrane means and said conductive elements spaced therefrom respectively serving as opposed field plates and cooperating to define a plurality of air gap capacitors addressable by said transistors; and said membrane means being deflectable in a direction toward said plurality of conductive elements in response to the respective charges placed on the plurality of air gap capacitors.

14. A light modulating semiconductor device as set forth in claim 13, wherein said plurality of upwardly extending conductive members are arranged in an integral grid configuration having a matrix of openings provided therein in registration with said matrix of conductive elements and respectively defining the air gaps between said conductive layer of said membrane means and said conductive elements.

15. A light modulating semiconductor device as defined in claim 14, further including a patterned insulating layer disposed atop said plurality of conductive members and having a configuration framing the matrix of openings provided by the integral grid configuration of said plurality of conductive members, said patterned insulating layer providing an upper level layer of insulating material, and said layer of insulating material disposed on said one surface of said substrate providing a lower level layer of insulating material;

conductive contact members disposed upon said upper level layer of insulating material and respectively overlying said plurality of conductive members; and said at least one conductive layer of said membrane means engaging said contact members of said plurality of conductive members.

16. A light modulating semiconductor device as set forth in claim 13, wherein said matrix of conductive elements respectively comprise floating metallic field plate members having a thickness rendering said field plate members opaque to incident light.

17. A light modulating semiconductor device as set forth in claim 13, wherein said plurality of spaced parallel elongated doped regions of the other conductivity type respectively extend to said one surface of said substrate.

18. A light modulating semiconductor device as set forth in claim 17, further including a martrix of spaced apart second doped regions of the other conductivity type disposed in said substrate and arranged in rows and columns, said second doped regions of the other conductivity type extending to said one surface of said substrate and respectively disposed in spaced relationship to the one of said first-mentioned doped regions of the other conductivity type corresponding thereto, each of said second doped regions of the other conductivity type being respectively substantially disposed beneath said conductive element corresponding thereto and spaced therefrom by said insulating layer interposed therebetween.

19. A light modulating semiconductor device as set forth in claim 18, wherein each of said second doped regions of the other conductivity type extends within said substrate beyond the perimeter of the conductive element corresponding thereto so as to include a portion thereof underlying the space defined between the corresponding conductive member and said conductive element by virtue of the offset relationship between said conductive member and said conductive element.

20. A light modulating semiconductor device as set forth in claim 17, further including a matrix of spaced apart second doped regions of the other conductivity type disposed in said substrate arranged in rows and columns and extending to said one surface of said substrate, each of said second doped regions of the other conductivity type extending beneath the conductive element corresponding thereto and partially beneath the respective one of said conductive members into the corresponding one of said first-mentioned doped regions of the other conductivity type and having a decreased dopant concentration as compared thereto.

21. A light modulating semiconductor device as set forth in claim 17, further including a matrix of spaced apart second doped regions of the other conductivity type disposed in said substrate and extending to said one surface thereof beneath corresponding ones of said conductive elements, and each second doped regions of the other conductivity type including marginal portions of reduced depth as compared to the remainder thereof.

22. A light modulating semiconductor device as set forth in claim 13, wherein said plurality of spaced parallel elongated doped regions of the other conductivity type are disposed in said substrate in buried relationship below said one surface thereof and beneath respective ones of said upwardly extending conductive members corresponding thereto.

23. A light modulating semiconductor device as set forth in claim 22, further including a matrix of spaced apart second doped regions of the other conductivity type disposed in said substrate and extending to said one surface thereof, each of said second doped regions of the other conductivity type being substantially disposed beneath said conductive element corresponding thereto and spaced therefrom by said insulating layer interposed therebetween.

24. A light modulating semiconductor device as set forth in claim 13, wherein said membrane means comprises first and second metal layers and a flexible non-metallic carrier layer interposed therebetween to form a composite membrane structure.

25. A light modulating semiconductor device as set forth in claim 24, wherein the metal layer of said membrane means proximally related to said plurality of conductive members is a composite two-ply metallic layer including an uppermost back-up metal layer in engagement with said non-metallic carrier layer of said membrane means and a lower metallic layer of a metal material exhibiting resistance to oxidation and low contact resistance.

26. A light modulating semiconductor device as set forth in claim 25, wherein said non-metallic carrier layer of said membrane means is an organic polymer.

27. A light modulating semiconductor device as set forth in claim 26, wherein said carrier layer of organic polymeric material of said membrane means is nitrocellulose.

28. A light modulating semiconductor device as set forth in claim 27, wherein said first metal layer and said uppermost back-up metal layer of said membrane means are antimony and said lower metallic layer is gold.

29. A spatial light modulator comprising:
a semiconductor substrate of one conductivity type;
means defining a matrix array of air gap capacitors arranged in a plurality of rows and columns and disposed on one surface of said semiconductor substrate;

charge-coupled device delay line means connected to one row or column of said matrix array of air gap capacitors for providing simultaneous signal inputs to each of the air gap capacitors arranged in one column or row of the matrix array;

decoder means connected to a plurality of air gap capacitors included in the other of a row or column of said matrix array and operable to select one line of said air gap capacitors at a time for readout; and said air gap capacitors being defined at least in part by membrane means having at least one conductive layer and disposed above said semiconductor substrate in spaced relationship thereto and by a plurality of spaced apart conductive elements disposed on said semiconductor substrate in spaced relationship with respect to said membrane means.

30. A line-addressed spatial light modulator structure comprising:

a semiconductor substrate of one conductivity type;

means defining a matrix array of air gap capacitors disposed on one surface of said semiconductor substrate, said air gap capacitor-defining means including membrane means having at least one conductive layer and disposed in spaced relationship to said substrate wherein said conductive layer serves as field plates of said matrix array of air gap capacitors, and a plurality of conductive elements disposed on said substrate in insulated relationship thereto and in spaced relationship to said membrane means for forming the other field plates of the respective air gap capacitors included in said matrix array;

means defining in said substrate a plurality of field effect address transistors corresponding to respective air gap capacitors and adapted to electronically address said air gap capacitors upon being rendered conductive, said address transistors including drain regions of the other conductivity type disposed in said semiconductor substrate and being common to all of said address transistors comprising respective lines;

line driver circuitry means operably connected to said drain regions of said address transistors;

analog delay line means connected to said line driver means for providing input signals to said address transistors;

said address transistors having respective gate electrodes defining horizontal lines in said matrix array; and decoder means connected to said gate electrodes of said address transistors.

31. A line-addressed spatial light modulator structure as set forth in claim 30, wherein said analog delay line means comprises first and second analog delay lines for alternately providing input signals to alternate lines of said address transistors such that even data bits of the input signal are received by one group of said address transistors via said first analog delay line and odd data bits of the input signal are received by the other group of said address transistors via said second analog delay line.

32. An optical modulator comprising:
a semiconductor substrate;
an array of charge-storing locations within said semiconductor substrate, each said charge-storing location comprising means for capacitatively storing charge;

a grounded flexible membrane supported parallel to and above and spaced apart from said semiconductor substrate, the locations of said charge-storing locations defining pixel locations within said flexible membrane; and an array of address transistors, each connected to a respective of one of said charge-storing locations, said address transistors being selectively addressable to selectively store charge in the corresponding one of said charge-storing locations, each said address transistor comprising a channel region within said substrate which is below and proximate to said corresponding pixel of said flexible membrane, said flexible membrane being entirely continuous above said array of charge-storing locations and said array of address transistors.

33. The modulator of claim 32, further comprising a plurality of respective field plates, one of said field plates being located atop said substrate and beneath said membrane at each of said respective pixel locations.

34. The modulator of claim 32, 33, wherein said membrane is continuous over said array of pixel locations, and is conductive and grounded.

35. The modulator of claim 34, wherein said membrane comprises nitrocellulose.

36. The modulator of claim 35, wherein said membrane further comprises:
a first metallization layer, comprising a metal having high reflectivity; and
a second layer of metal having a high conductivity.

37. The modulator of claim 33, wherein the space between said membrane and said field plate is less than the maximum elastic deformation of said membrane above said respective field plate.

38. An optical modulator comprising:
a semiconductor substrate;
a plurality of gate lines located on said substrate and protruding above said substrate, each said gate line defining a column of pixel locations;
a plurality of conductive row lines within said substrate, each said row line defining a row of pixel locations;
a reflective, flexible, and conductive membrane positioned on said gate lines; and
a plurality of charge-storing locations located at respective pixel locations at intersections of rows and columns defined by said gate lines and said row lines, each said charge-storing location defining and corresponding to a pixel location of said membrane above said location, each said charge-storing location comprising means for capacitatively storing charge;
whereby each said respective charge-storing location is selectively addressable by one of said gate lines and one of said row lines to store charge therein.

39. The modulator of claim 38, further comprising a plurality of respective field plates, one of said field plates being located atop said substrate and beneath said membrane at each of said respective pixel locations.

40. The modulator of claim 39, wherein said field plate and said respective gate lines are insulated from said substrate by a gate insulator layer.

41. An optical modulator, comprising:
a semiconductor substrate, having a first conductivity type;
a gate insulator on said substrate;

a plurality of conductive field plates on said gate insulator, said plurality of field plates defining a matrix of pixel locations;

a plurality of row lines, comprising elongated regions of second conductivity type near the surface of said substrate;

a plurality of second-conductivity-type charge-storing-locations, respectively located beneath each said field plate, each said charge-storing-location defining a channel region with respect to exactly one adjacent row line, each said charge-storing location comprising means for capacitatively storing charge;

a plurality of conductive gate regions, said conductive gate regions being elongated to form column lines orthogonal to said row lines, each said channel region being located beneath a portion of one of said gates;

an insulating cap on said gates; and a membrane structure on said insulating cap, said membrane structure being flexible and including reflective and conductive layers.

42. The modulator of claim 38, 39, or 40, wherein said membrane is continuous over said array of pixel locations, and is conductive and grounded.

43. The modulators of claim 41, 39, or 40, wherein the space between said membrane and said field plate is less than the maximum elastic deformation of said membrane above said respective field plate.

* * * * *